US012793380B2

(12) United States Patent
Braun et al.

(10) Patent No.: US 12,793,380 B2
(45) Date of Patent: Nov. 10, 2026

(54) METHOD FOR DETERMINING SPATIAL-TEMPORAL PATTERNS RELATED TO THE ENVIRONMENT OF A VEHICLE

(71) Applicant: Aptiv Technologies AG, Schaffhausen (CH)

(72) Inventors: Marco Braun, Düsseldorf (DE); Moritz Luszek, Detmold (DE)

(73) Assignee: Aptiv Technologies AG, Schaffhausen (CH)

( * ) Notice: Subject to any disclaimer, the term of this patent is extended or adjusted under 35 U.S.C. 154(b) by 231 days.

(21) Appl. No.: 18/747,788

(22) Filed: Jun. 19, 2024

(65) Prior Publication Data

US 2025/0005890 A1 Jan. 2, 2025

(30) Foreign Application Priority Data

Jun. 29, 2023 (EP) .................................... 23182483

(51) Int. Cl.
*G06V 10/46* (2022.01)
*G06V 20/56* (2022.01)

(52) U.S. Cl.
CPC ............ *G06V 10/469* (2022.01); *G06V 20/56* (2022.01)

(58) Field of Classification Search
USPC .......................................................... 382/195
See application file for complete search history.

(56) References Cited

U.S. PATENT DOCUMENTS

2023/0032132 A1* 2/2023 Reshef .................... G06F 18/22
2024/0362902 A1* 10/2024 Wei ........................ G06T 7/246

FOREIGN PATENT DOCUMENTS

CN 110333517 B 11/2022

OTHER PUBLICATIONS

Braun (Braun Marco et al: "Deep Learning Method for Cell-Wise Object Tracking, Velocity Estimation and Projection of Sensor Data over Time", 2022 IEEE 25th International Conference on Intelligent Transportation Systems (ITSC), IEEE, Oct. 8, 2022 (Oct. 8, 2022)) (Year: 2022).*

Schafer (Schafer Maximilian et al: "Context-Aware Scene Prediction Network (CASPNet)", 2022 IEEE 25th International Conference on Intelligent Transportation Systems (ITSC), IEEE, Oct. 8, 2022 (Oct. 8, 2022)) (Year: 2022).*

(Continued)

*Primary Examiner* — Jacky X Zheng

(74) *Attorney, Agent, or Firm* — Harness, Dickey & Pierce, P.L.C.

(57) ABSTRACT

A method is provided for determining patterns related to an environment of a host vehicle. Characteristics are detected by a perception system of the host vehicle within the environment of the host vehicle. At least two processing levels having different scales are defined. For each processing level, respective current input data associated with the characteristics for a current point in time is combined with respective memory data related to the characteristics for previous points in time in order to generate joint spatial-temporal data for the respective processing level. An attention algorithm is applied to the joint spatial-temporal data of all processing levels for generating an aggregated data set, and at least one pattern related to the environment is determined from the aggregated data set.

13 Claims, 8 Drawing Sheets

(56) References Cited

OTHER PUBLICATIONS

Extended European Search Report regarding European Patent Application No. 23182483.0 dated Nov. 8, 2023.
"Deep Learning Method for Cell-Wise Object Tracking, Velocity Estimation and Projection of Sensor Data over Time," M. Braun, et al., 2022 IEEE 25th International Conference on Intelligent Transportation Systems (ITSC), Oct. 12, 2022.
"Context-Aware Scene Prediction Network (CASPNet)," 2022 IEEE 25th International Conference on Intelligent Transportation Systems (ITSC), Oct. 12, 2022.
"CIPF: Crossing Intention Prediction Network based on Feature Fusion Modules for Improving Pedestrian Safety," J. Ham, et al., 2023 IEEE/CVF Conference on Computer Vision and Pattern Recognition Workshops (CVPRW).
"Long-Term Occupancy Grid Prediction Using Recurrent Neural Networks," M. Schreiber, et al., Jun. 7, 2019.
"Motion Estimation in Occupancy Grid Maps in Statoinary Settings Using Recurrent Neural Networks," M. Schreiber, May 5, 2022.
"Attention Is All You Need," A. Vaswani, et al., Aug. 2, 2023.

* cited by examiner

600

METHOD FOR DETERMINING SPATIAL-TEMPORAL PATTERNS RELATED TO THE ENVIRONMENT OF A VEHICLE

CROSS-REFERENCE TO RELATED APPLICATIONS

This application claims the benefit and priority of European patent application number EP23182483.0, filed on Jun. 29, 2023. The entire disclosure of the above application is incorporated herein by reference.

FIELD

This section provides background information related to the present disclosure which is not necessarily prior art.

The present disclosure relates to a method for determining multi-scale spatial-temporal patterns related to an environment of a host vehicle from sequentially recorded data.

BACKGROUND

For autonomous driving and various advanced driver-assistance systems (ADAS), it is an important and challenging task to understand the traffic scene in the external environment surrounding a host vehicle. For example, based on sensor data acquired at the host vehicle, spatial and temporal correlations may be exploited for understanding the traffic scene, e.g. for tracking and/or anticipating the dynamics of any items present in the external environment.

For providing information regarding the environment of the host vehicle, machine learning algorithms including recurrent units may be applied to data provided by sequential sensor scans performed by sensors of a perception system of the host vehicle. Such machine learning algorithms may be able to derive spatial and temporal patterns which are related, for example, to moving objects in the environment of the host vehicle, via the data provided by the sequential sensor scans.

In detail, such sensor scans are performed for a predefined number of points in time, and sensor data may be aggregated over the previous points in time, i.e. before a current point in time, in order to generate a so-called memory state. The memory state is combined with data from a current sensor scan, i.e. for the current point in time, in order to derive the spatial and temporal pattern, i.e. based on correlations within the sequential sensor scans.

Machine learning algorithms including recurrent units may also use multiple scales, i.e. multiple spatial resolutions, for the input data provided by a current sensor scan and for the memory state. The input data and the memory state having different scales or resolutions are processed by a respective recurrent unit separately for each scaling or resolution level, and features provided of the respective recurrent unit on each scaling level are recombined thereafter over all scaling levels. By this means, spatial-temporal correlations within the sensor scans may be exploited, e.g. in order to increase the maximum resolvable velocities which may be derived for items or objects within the receptive field of the sensors.

However, known machine learning algorithms typically use a static recombination of the spatial-temporal patterns or correlations which may be extracted for the respective scales or resolutions of the input data and the memory state. This may be a significant weakness of existing approaches since these may have a low flexibility when an adaptation to varying conditions in the environment of a host vehicle may be required.

Accordingly, there is a need to have a method which is able to provide reliable spatial-temporal patterns for an environment of a vehicle for varying environmental conditions.

SUMMARY

This section provides a general summary of the disclosure, and is not a comprehensive disclosure of its full scope or all of its features.

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining patterns related to an environment of a host vehicle from sequentially recorded data. According to the method, sets of characteristics are determined within the environment of a host vehicle, wherein the characteristics are detected by a perception system of the host vehicle for a current point in time and for a predefined number of previous points in time. Via a processing unit of the host vehicle, at least two processing levels having different scales are defined for data associated with the respective level. For each processing level, a respective set of current input data associated with the set of characteristics for a current point in time is combined with a respective set of memory data related to sets of characteristics for previous points in time in order to generate a set of joint spatial-temporal data for the respective processing level. An attention algorithm is applied to the sets of joint spatial-temporal data of all processing levels in order to generate an aggregated data set, and at least one pattern related to the environment of the host vehicle is determined from the aggregated data set.

The perception system may include, for example, a radar system, a Lidar system and/or one or more cameras being installed at the host vehicle in order to monitor its external environment which may be mapped into a bird's-eye view, for example. Hence, the perception system may be able to monitor a dynamic context of the host vehicle including a plurality of objects which are able to move in the external environment of the host vehicle. The objects may include other vehicles and/or pedestrians, for example. The perception system may also be configured to monitor static objects, i.e. a static context of the host vehicle. Such static objects may include traffic signs or lane markings, for example, if the perception system of the vehicle includes a radar system and one or more cameras, for example.

The respective set of characteristics detected by the perception system may be acquired from the sequentially recorded data by using a constant sampling rate, for example. Therefore, the current and previous points in time may be defined in such a manner that there is a constant time interval therebetween. However, a constant sampling rate is not a prerequisite for performing the method. A predefined number of previous points in time may include an earliest point in time and a latest point in time which may immediately precede the current point in time.

The output of the method, i.e. the at least one pattern related to the environment of the host vehicle, may be provided as an abstract feature map which may be stored in a grid map. The grid map may be represented by a two-dimensional grid in bird's eye view with respect to the vehicle. However, other representations of the grid map may be realized alternatively. The grid map may include a predefined number of cells. With each cell, a predefined number of features may be associated in order to generate the feature map.

Further tasks being implemented e.g. as further respective machine learning algorithms may be applied, e.g. comprising a decoding procedure, to the feature map including the at least one pattern related to the environment of the host vehicle. These tasks may include different kinds of information regarding the dynamics of a respective object, e.g. regarding its position, its velocity and/or regarding a bounding box surrounding the respective object. That is, the objects themselves, i.e. their positions, and their dynamic properties may be detected and/or tracked by applying a respective task to the feature map including the pattern. Moreover, a grid segmentation may be performed as a task being applied to the feature map, e.g. in order to detect a free space in the environment of the host vehicle.

The method may be implemented as one or more machine learning algorithms, e.g. as neural networks for which suitable training procedures are defined. When training the machine learning algorithms or neural networks, the output of the method and a ground truth may be provided to a loss function for optimizing the respective machine learning algorithm or neural network. The ground truth may be generated for a known environment of the host vehicle for which sensor data provided by the perception system may be preprocessed in order to generate data e.g. associated with a grid map in bird's eye view.

This data may be processed by the method, and the respective result of the further tasks, e.g. regarding object detection and/or segmentation for determining a free space, may be related to the known environment of the host vehicle. The loss function may acquire an error of a model with respect to the ground truth, i.e. the model on which the machine learning algorithm or neural network relies on. Weights of the machine learning algorithms or neural networks may be updated accordingly for minimizing the loss function, i.e. the error of the model.

The method according to the disclosure differs from previous approaches in that an attention algorithm is applied for aggregating the at least two processing levels, i.e. the sets of spatial-temporal data generated for each processing level. For each processing level, the attention algorithm may determine specific weights for the aggregation which may be based on correlations determined by the combination of current input data and memory data on each level.

For example, if the method is implemented as a machine learning algorithm, a query valid for all processing levels may be matched with keys being determined for each processing level individually in order to provide the specific weights for each processing level. These weights may be combined with values provided for each processing level which may also be based on a combination of the set of current input data with the respective of memory data on each processing level.

Therefore, the method is able to dynamically determine how the joint spatial-temporal data extracted on the respective processing level having a specific scaling or resolution are to be combined, e.g. in order to meet target objective functions, since the weights and therefore the aggregation performed by the attention algorithm is based on the characteristics obtained by the perception system. Moreover, the weights are able to define the extent to which the spatial-temporal data for each of the processing levels are considered in the resulting output or feature map of the method according to the disclosure. Hence, the method is able to be adapted dynamically to varying environmental conditions of the host vehicle.

According to an embodiment, the respective set of current input data and the respective set of memory data may be associated with respective grid maps having different respective spatial resolutions on each processing level. The association with the grid maps may facilitate the representation of the respective patterns related to the environment of the host vehicle. For example, the grid maps may include a plurality of grid cells, each comprising different channels for each of the respective characteristics detected in the environment of the host vehicle.

The first processing level may be provided with a highest grid resolution, and subsequent processing levels may be provided with a grid resolution being lower than the highest grid resolution. In other words, a hierarchy may be defined for the scales or resolutions being defined for the different processing levels. That is, a refinement regarding the scaling or the resolution may be provided from the last processing level up to the first processing level. This may improve the adaptation of the method to varying environmental conditions.

According to a further embodiment, the attention algorithm may include a query vector being independent from the processing levels. Moreover, the attention algorithm may include respective key vectors and value vectors defined on each respective processing level after combining the respective set of current input data with the respective set of memory data. The key vectors of each processing level may be combined with the query vector in order to provide weights for elements of the value vector.

Hence, the key vectors and therefore weights on each processing level may depend on the respective joint spatial-temporal data describing the spatial-temporal correlations between the current input data and the set of memory data on each processing level, i.e. for the different scalings or resolutions. The key vectors of each processing level may be combined via a dot product with the query vector being independent from the processing levels such that the weights for each processing level describe a matching of the key vectors and the query vectors on each processing level. Hence, the weights for each processing level, i.e. for the respective scaling or resolution of this level, may be determined in parallel to the weights of the further processing levels. During training of a machine learning algorithm, for example, specific weights to obtain the value vector from the respective set of respective input data may be learned or adapted individually for each level. Using these specific weights, the value vector may be calculated from the respective set of input data for each level. Finally, the value vector for the respective level may finally be weighted by the respective matching of the key vectors and the query vectors.

The respective key vector and the respective value vector defined on the respective processing levels may be up-sampled to a resolution of the query vector if the resolution of the respective processing level is lower than the resolution of the query vector. For example, the query vector may also be related to a grid map having a predefined resolution or scaling and being associated with the current set of input data on which the query vector relies. In contrast, the respective key vectors defined on the respective processing level having different scales may be related to a different grid resolution. Therefore, the up-sampling of the respective key vectors to the resolution of the query vector may ensure the compatibility of the key vectors with the query vector in order to combine these e.g. by a dot product for determining the weights which are used for the elements of the value vector when aggregating the different processing levels within the attention algorithm. For example, the up-sampling of the key vector may be performed by applying an interpolation to elements of the key vector. The interpolation may be implemented as a nearest-neighbor interpolation, a bilinear interpolation, a bicubic interpolation. As an alternative, a deconvolution may be applied to perform the up-sampling. However, up-sampling may not be mandatory in order to perform the aggregation of the processing levels via the attention algorithm.

The combination of the respective set of current input data and the respective set of memory data may be provided by applying a recurrent algorithm on each processing level. For example, a convolutional gating recurrent unit (ConvGRU) may be applied. Although recurrent algorithms are generally known, they are used in context of the method according to the disclosure in a special manner on each processing level in order to provide the basis for calculating the key vectors and the value vectors for the attention algorithm.

The at least one pattern related to the environment of the host vehicle may be associated with at least one object being detected in the environment of the host vehicle. However, any arbitrary environmental pattern which is not necessarily related to a certain object may be derived by the method according to the disclosure. If the at least one pattern is associated with at least one detected object, the corresponding pattern may be employed for tracking this object. For example, a velocity of the object may be derived with an increased reliability due to the adaptation of the scalings provided for the respective processing levels to the varying environmental conditions.

In another aspect, the present disclosure is directed at a computer system, said computer system being configured to carry out several or all steps of the computer implemented method described herein. The computer system may be further configured to receive respective sets of characteristics within the environment of a host vehicle, the characteristics being detected by a perception system of the host vehicle for a current point in time and for a predefined number of points in time before the current point in time.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, terms like processing unit and module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle including a perception system and the computer system as described herein. The vehicle may be an automotive vehicle, for example.

According to an embodiment, the vehicle may further include a control system being configured to receive information derived from the at least one pattern provided by the computer system and to apply the information for controlling the vehicle.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

FIG. 1 an illustration of a vehicle including a computer system according to the disclosure and of the vehicle's surroundings.

Corresponding reference numerals indicate corresponding parts throughout the several views of the drawings.

DETAILED DESCRIPTION

Example embodiments will now be described more fully with reference to the accompanying drawings.

Figure 1:
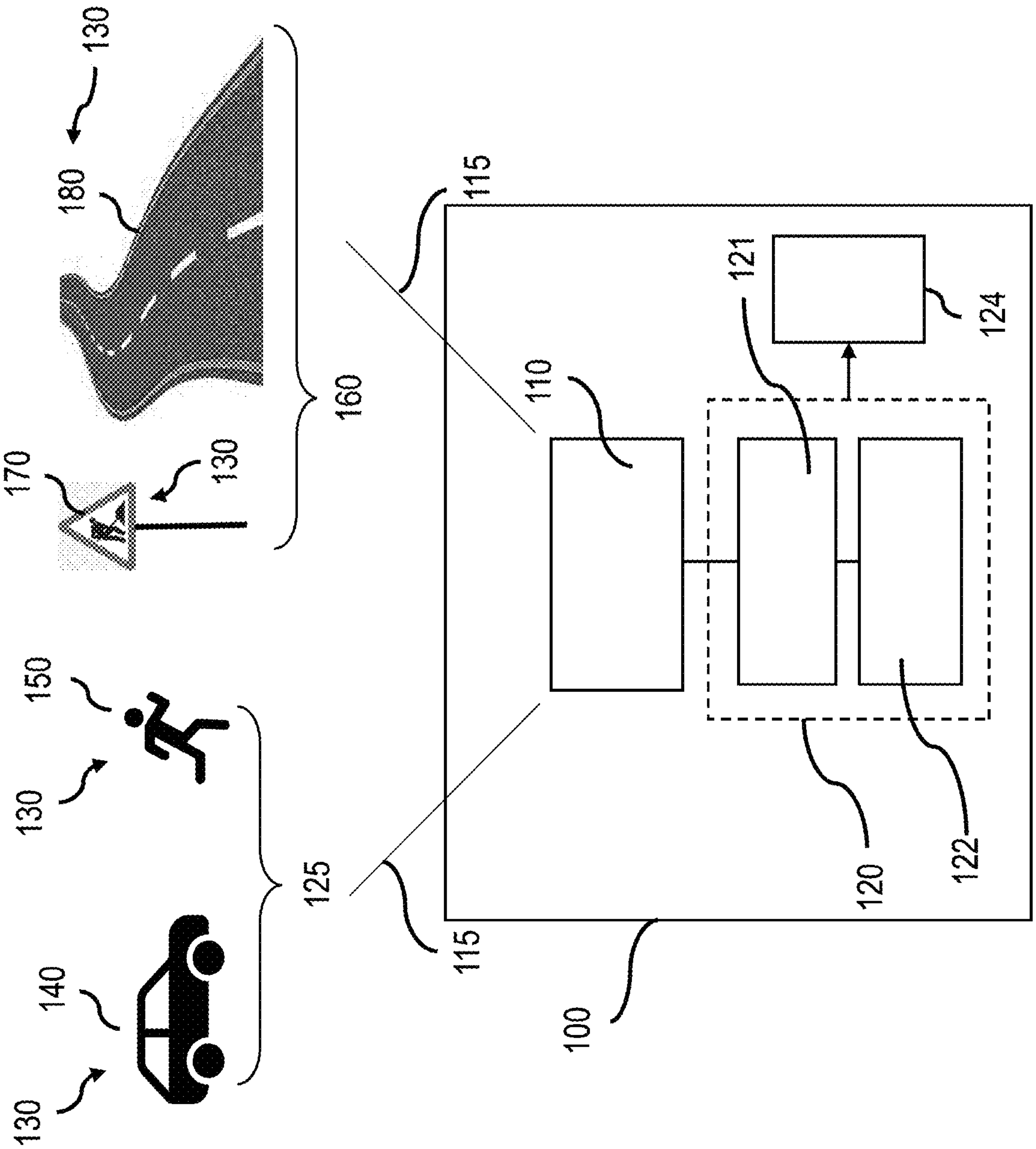

FIG. 1 depicts a schematic illustration of a vehicle 100 and of objects 130 possibly surrounding the vehicle 100 in a traffic scene. The vehicle 100 includes a perception system

110 having an instrumental field of view which is indicated by lines 115. The vehicle 100 further includes a computer system 120 including a processing unit 121 and a data storage system 122 which includes a memory and a database, for example. The processing unit 121 is configured to receive data from the perception system 110 and to store data in the data storage system 122. The vehicle 100 further includes a control system 124 which is configured to control the vehicle 100.

The perception system 110 may include a radar system, a LiDAR system and/or one or more cameras in order to monitor the external environment or surroundings of the vehicle 100. Therefore, the perception system 110 is configured to monitor a dynamic context 125 of the vehicle 100 which includes a plurality of objects 130 which are able to move in the external environment of the vehicle 100. The objects 130 may include other vehicles 140 and/or pedestrians 150, for example.

The perception system 110 is also configured to monitor a static context 160 of the vehicle 100. The static context 160 may include static objects 130 like traffic signs 170 and lane markings 180, for example.

The perception system 110 is configured to determine characteristics of the objects 130. The characteristics include a current position, a current velocity and an object class of each road user 130 for a plurality of points in time. The current position and the current velocity are determined by the perception system 110 with respect to the vehicle 100, i.e. with respect to a coordinate system having its origin e.g. at the center of mass of the vehicle 100, its x-axis along a longitudinal direction of the vehicle 100 and its y-axis along a lateral direction of the vehicle 100. Moreover, the perception system 100 determines the characteristics of the road users 130 for a predetermined number of previous points in time and for a current point in time, e.g. for each 0.5 s.

The computer system 120 transfers information derived from the result or output 250 (see FIG. 2) of the method according to the disclosure, i.e. from at least one pattern related to the environment of the host vehicle 100, to the control system 124 in order to enable the control system 124 to use the information derived from the at least one pattern for controlling the vehicle 100.

Figure 2:
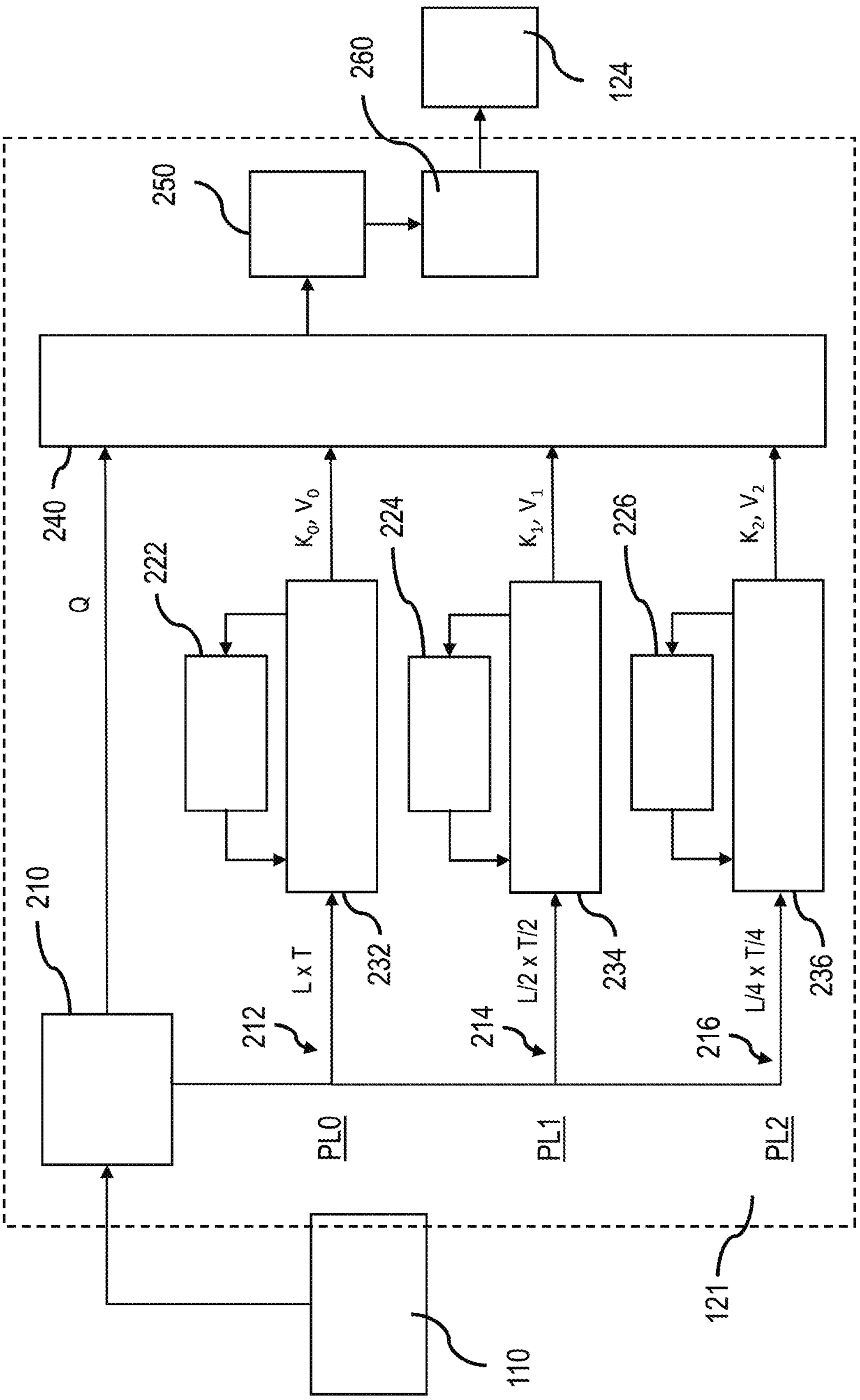
FIG. 2 is an illustration of an overview of the method according to the disclosure.

FIG. 2 depicts an overview of a method according to the disclosure for determining patterns related to an environment of the host vehicle 100 (see e.g. FIG. 1) from sequentially recorded data. First, for a plurality of objects 130 (see FIG. 1) in the environment of the host vehicle 100, a respective set of characteristics is detected by the perception system 110 of the host vehicle 100 for a current point in time and for a predefined number of previous points in time.

The characteristics for the current and the previous points in time are transferred to the processing unit 121 which generates a set of current input data 210 associated with the sets of characteristics for the current point in time, and a primary set of memory data $H_{t-1}$ by aggregating the sets of characteristics over the predefined number of previous points in time.

The set of current input data 210 and the primary set of memory data $H_{t-1}$ are associated with respective grid maps defined for the receptive field within the environment of the host vehicle 100. That is, the respective dynamic and static contexts 125, 160 (see FIG. 1) are provided in form of images for the current point in time and as an aggregation for the previous points in time. In other words, the characteristics of the objects 130 are rasterized or associated with respective elements of the grid maps within a predefined region of interest around the vehicle 100. The predefined region of interest of the vehicle 100 is first rasterized as an empty multi-channel image in which each pixel covers the fixed area.

Accordingly, the set of current input data 210 is associated with a grid map including L×T pixels, wherein L denotes the number of pixels in a first or longitudinal direction and T denotes the number of pixels in a second or transversal direction. For example, the region of interest may cover an area of 280 m×160 m in front of the vehicle 100 and may be rasterized into a 280×160 pixel image, wherein each pixel represents a square area of 1 m×1 m.

For each pixel or cell of the respective grid map or image, a respective channel is associated with one of the characteristics or features of the object 130. Hence, the empty multi-channel image mentioned above and representing the rasterized region of interest close to the vehicle 100 is filled by the characteristics of the objects 130 which are associated with the respective channel of the pixel or grid cell.

Figure 3:
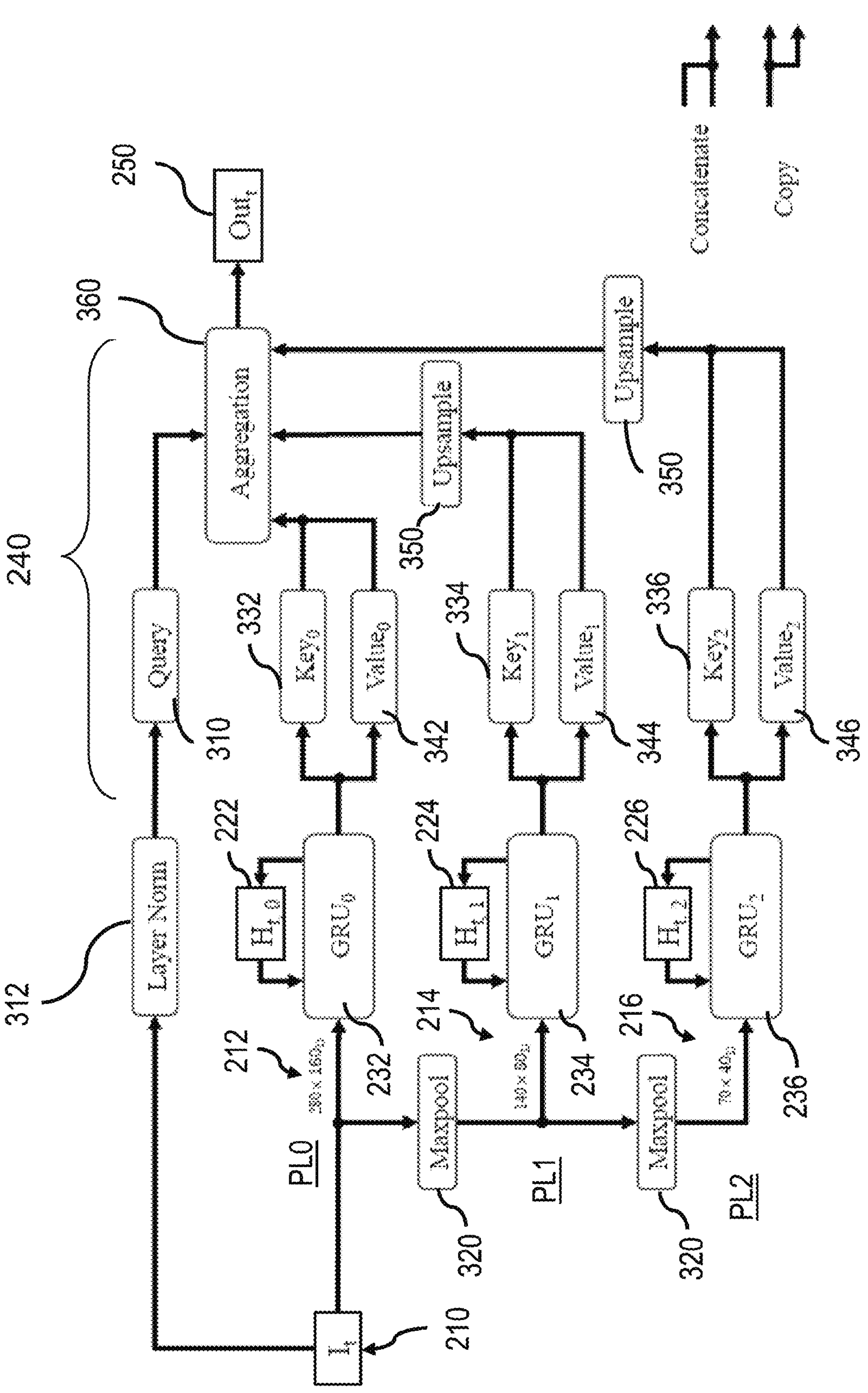
FIG. 3 is an illustration of details regarding the steps of the method as shown in FIG. 2.

For processing the current input data 210, processing levels PL0, PL1, PL2 are defined, each of which has a different scale or resolution for the data associated with respective levels. In the example as shown in FIGS. 2 and 3, three processing levels PL0, PL1, PL2 are provided to which a modified version of the original current input data 210 is respectively transferred.

The first processing level PL0 has a scaling or resolution of L×T, i.e. a resolution which is identical to the resolution of a grid map the original current input data 210 are associated with. That is, the first processing level PL0 receives a set of current input data 212 which is associated with the set of characteristics for the current point in time and associated with a grid map having a scaling or spatial resolution of L×T like the original current input data 210.

The second processing level PL1 has a scaling or spatial resolution of L/2×T/2, i.e. half of the resolution of the first processing level PL0. On the second processing level PL1, a set of current input data 214 is generated which is associated with a grid map of this processing level PL1 having the scaling or resolution of L/2×T/2. Similarly, the third processing level PL2 has a further reduced scale or resolution of L/4×T/4, i.e. with respect to the resolution of L×T of the grid map associated with the original current input data 210.

Each processing level PL0, PL1, PL2 includes a respective recurrent unit 232, 234, 236 which combines the respective set of current input data 212, 214, 216 for each processing level PL0, PL1, PL2 with a respective set of memory data 222, 224, 226 which are respectively related to the sets of characteristics for the previous points in time. The respective set of memory data 222, 224, 226 is also associated with the respective grid map having the same resolution as provided for the respective grid map associated with the respective set of current input data 212, 214, 216 on each processing level PL0, PL1, PL2.

The respective recurrent units 232, 234, 236 generate, as a respective output on each processing level PL0, PL1, PL2, a set of joint spatial-temporal data based on the combination of the respective set of current input data 212, 214, 216 with the respective set of memory data 222, 224, 226. The respective joint spatial-temporal data of each processing level PL0, PL1, PL2 are used to provide a respective input for an attention algorithm 240.

In detail, a respective key vector $K_0$, $K_1$, $K_2$ and a respective value vector $V_0$, $V_1$, $V_2$ is calculated on each processing level PL0, PL1, PL2 based on the output of the respective recurrent unit 232, 234, 236 and provided as an input for the attention algorithm 240. In addition, a query vector Q is generated based on the original set of current input data 210 and also provided as an input for the attention algorithm 240. The query vector Q is independent from the processing levels PL0, PL1, PL2.

The attention algorithm 240 performs a matching of the query vector Q with the key vectors $K_0$, $K_1$, $K_2$ of the respective processing level PL0, PL1, PL2 in order to provide weights for the respective value vectors V0, V1, V2 when aggregating the data provided on the different processing level PL0, PL1, PL2, as will be described in detail below. Based on this aggregation, the attention algorithm 240 provides an output 250 of the method according to the disclosure, i.e. at least pattern related to the environment of the host vehicle 100 (see FIG. 1) from the aggregated data set.

The output 250, i.e. the at least one pattern related to the environment of the host vehicle 100, is provided as an abstract feature map which is stored in a grid map. This grid map is generated in a similar manner as described above for the grid map generated for associating the set of current input data 210.

The respective grid maps for the output 250 and for the set of current input data 210 are represented by a two-dimensional grid in bird's eye view with respect to the host vehicle 100. However, other representations of the grid maps may be realized alternatively. The grid maps include a predefined number of cells. For the output 250, a predefined number of features is assigned to each cell in order to generate the feature map.

The output 250, i.e. the feature map described above, is transferred to a task module 260 which applies further tasks to the feature map including the at least one pattern related to the environment of the host vehicle 100. These tasks include tasks related to an object detection and/or to a segmentation of the environment of the host vehicle 100, i.e. to a segmentation of the grid map associated with the output 250.

The object detection provides different kinds of information regarding the dynamics of a respective object 130, e.g. regarding its position, its velocity and/or regarding a bounding box surrounding the respective object 130. That is, the objects 130 themselves, i.e. their positions, and their dynamic properties are detected and/or tracked by applying a respective task of the task module 260 to the feature map including the pattern. Moreover, the grid segmentation is applied e.g. in order to detect a free space in the environment of the host vehicle 100.

The results of the task module 260 as described above are provided to the control system 124 in order to use these results, e.g. the properties of the objects 130 and/or the free space, as information for controlling the host vehicle 100.

The recurrent units 232, 234, 236 and the attention algorithm 240, are implemented as respective machine learning algorithms, e.g. as a respective neural network for which suitable training procedures are defined. The task module 260 including the further tasks is also implemented as one or more machine learning algorithms, e.g. comprising a respective decoding procedure, being associated with the respective task. The task module 260 includes a respective head for each required task.

When training the machine learning algorithms or neural networks, the output 250 and a ground truth are provided to a loss function for optimizing the neural network. The ground truth is generated for a known environment of the host vehicle 100 for which sensor data provided by the perception system is preprocessed in order to generate data associated with a grid map e.g. in bird's eye view. This data is processed by the method, and the respective result of the different heads of the task module 260, i.e. regarding object detection and/or segmentation for e.g. determining a free space, is related to the known environment of the host vehicle 100. The loss function acquires the error of a model, i.e. the model on which the machine learning algorithm or neural network relies, with respect to the ground truth. Specific weights of the machine learning algorithms or neural networks are updated accordingly for minimizing the loss function, i.e. the error of the model.

FIG. 3 depicts details for the different items and elements of the method according to the disclosure as shown in FIG. 2. The method is implemented as a machine learning algorithm, e.g. a neural network, which includes respective sets of layers for the items or elements as shown in FIGS. 2 and 3.

Before the query vector 310 is generated based on the original set of current input data 210, a layer norm 312 is applied to these original input data 210 to obtain a uniform distribution of values across training samples, i.e. when a training procedure of the entire neural network is performed. Via the layer norm 312, the current input data or feature map 210 is scaled by a variance across entries calculated within a layer.

If the layer norm 312 is applied to a sparse feature map or set of current input data 210 as provided e.g. by radar sensors, large peaks, i.e. having values in a range much greater than e.g. 1, may be obtained due to a significant imbalance in the sparse feature map or input data between entries containing relevant values and empty background. For example, a few entries in the spares feature map may have values>0 while a broad majority of entries may have values equal to 0. For the sparse feature maps provided by a radar sensor, for example, the imbalance between the entries of the feature map or input data may be reduced by scaling the feature map or input data $I_t$ subjected to the layer norm 312 by a factor of 1/20.

In the example as shown in FIG. 3, the set of original current input data 210 is associated with a grid map having a size of 280×160 cells in order to provide the set of current input data 212 for the first processing level PL0. Maxpool layers 320 are applied to the set of original current input data 210 in order to generate the set of current input data 214, 216 for the second processing level PL1 and the third processing level PL2 which have a respective lower scale or resolution of 140×80 and 70×40, respectively, for the grid map for associating the respective set of current input data 214, 216 therewith.

The respective recurrent units 232, 234, 236 for each processing level PL0, PL1, PL2 is realized as a respective convolutional gating recurrent unit (ConvGRU) which combines the respective set of current input data 212, 214, 216 with the respective set of memory data 222, 224, 226.

The spatial-temporal data or features extracted by the respective ConvGRU 232, 234, 236 are employed for generating respective key vectors 332, 334, 336 and respective value vectors 342, 344, 346 for each of the processing level PL0, PL1, PL2. The respective key vectors 332, 334, 336 are matched with the query vector 310 within an aggregation module 360 of the attention algorithm 214 in order to provide weights for a data aggregation over all processing levels PL0, Pl1, PL2, as will be described in detail below in context of FIG. 4. Before aggregating the second and third processing levels PL1, PL2, the respective key vectors 334, 336 and value vectors 344, 346 of these processing levels are up-sampled as indicated by 350 in order to be compatible with the size or dimension of the query vector 310. Details for the up-sampling 350 will be provided in context of FIG. 5.

Figure 4:
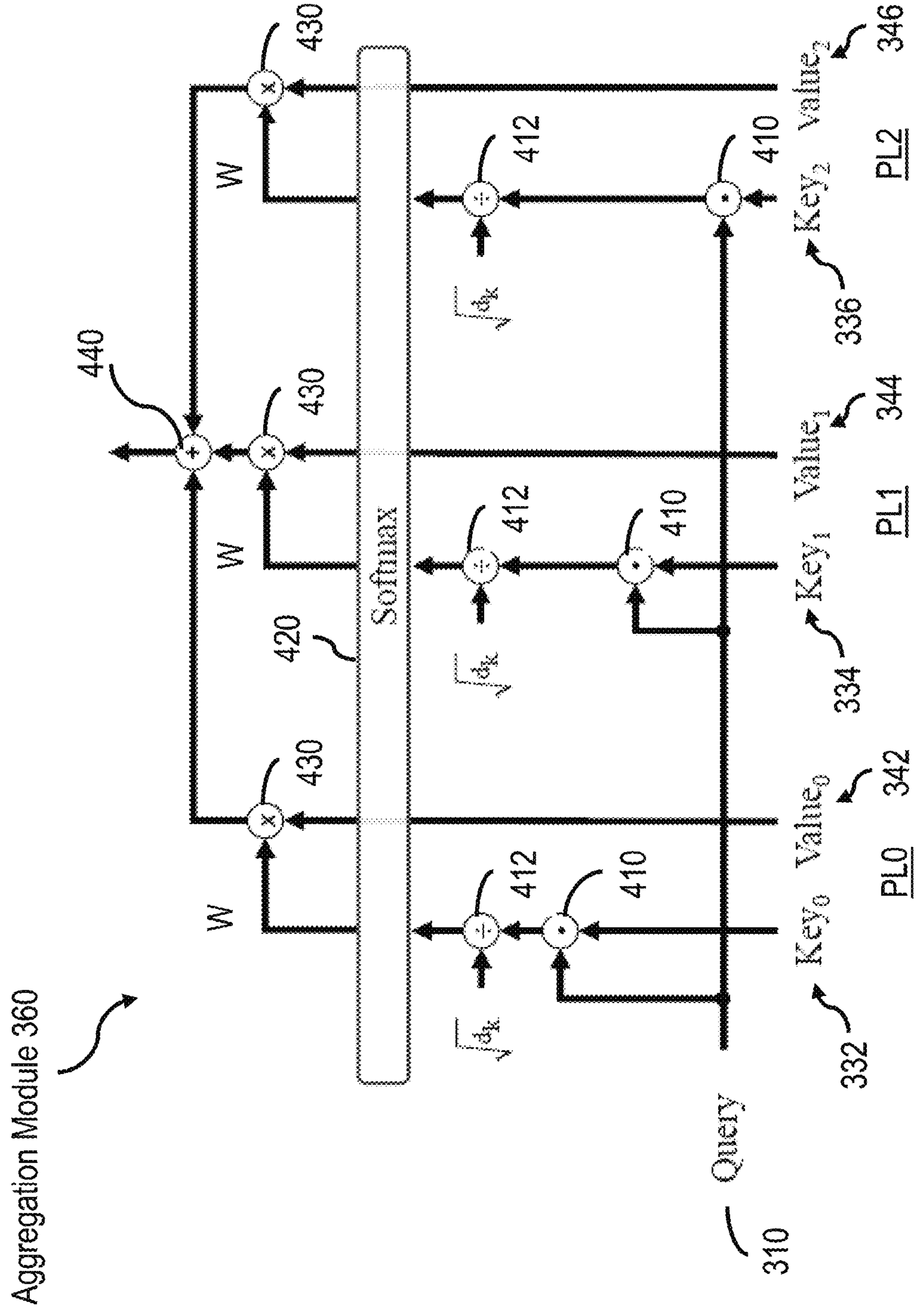
FIG. 4 is an illustration of details for the aggregation module as shown in FIG. 3.

FIG. 4 depicts details of the aggregation module 360 of the attention algorithm 240 (see FIG. 3). After applying the layer norm 312 to the set of original current input data 210, the query vector 310 is generated independently from the processing levels PL0, PL1, PL2. In detail, the input data or features $I_{t,N}$ subjected to the layer norm 312 are linearly projected by a dense layer of the neural network in order to calculate the query vector 310 as follows:

$$Q = f_{\theta_Q}^{Q}(I_t) \tag{1}$$

wherein $\theta_Q$ defines a set of trainable parameters. Each of L×T grid cells associated with the set of current input data $I_t$ is assigned to a distinct query vector of size $d_k$, and therefore the final query vector or query matrix 310 is defined regarding its dimension as $$Q \in \mathbb{R}^{d_k \times L \times T} \tag{2}$$

The query vector or matrix 310 is matched with the respective key vectors 332, 334, 336 generated for each processing level PL0, PL1, PL2 and, in detail, calculated by linear dense layers as follows:

$$K_i = f_{\theta_K}^{K}(H_{t,i}) \quad \forall\, i \in [1, \ldots, N_p] \tag{3}$$

wherein the key vectors $K_i$ are obtained from the feature maps or joint spatial-temporal data $H_{t,i}$ resulting from the respective ConvGRU 332, 334, 336 (see FIG. 3). $N_p$ denotes the number of processing levels PL0, PL1, PL2 corresponding to the number of different scales or resolutions of the grid associated with the current input data on the respective processing level. Hence, $N_p$ is equal to three for the example as shown in FIGS. 2 and 3. $\theta_K$ defines a set of trainable parameters which are utilized to calculate the key vectors $K_i$. In a similar manner as for the query vector or matrix 310, the keys $K_i$ are defined regarding their dimensions by $$K_i \in \mathbb{R}^{d_k \times L_i \times T_i} \quad \forall\, i \in [1, \ldots, N_p] \tag{4}$$

wherein $L_i$ und $T_i$ denote the number of grid cells in the longitudinal and transversal dimension for the respective processing level PL0, PL1, PL2.

At 410, the respective key vectors $K_i$ 332, 334, 336 are matched with the query vector or matrix 310 for each processing level PL0, PL1, PL2, respectively, wherein a dot product of the respective key vector 332, 334, 336 and the query vector or matrix 310 is calculated. Before calculating the dot products, the key vectors 334, 336 of the second and third processing levels PL1, PL2 are up-sampled as mentioned above and described in detail below in context of FIG. 5.

At 412, the dot products calculated at 410 are divided by $\sqrt{d}$ in order to provide a value range allowing larger gradients to pass the subsequent softmax function 420 in order to generate weights W for the value vectors 342, 344, 346 on each processing level PL0, PL1, PL2. Since the weights W are generated by an attention algorithm using a dot product of key and query vectors, the weights may be denoted as attention weights and defined regarding their dimension by:

$$W^{Att} \in \mathbb{R}^{N_p \times L \times T} \tag{5}$$

wherein $$\sum_{n}^{N_p} W_{n,x,y}^{Att} = 1 \quad \forall\, x \in X, y \in Y \tag{6}$$

wherein X and Y denote the respective set of cells along the longitudinal and transversal dimension for the grid cells provided for respective processing level PL0, PL1, PL2.

At 430, the weights $W^{Att}$ are applied to the respective value vectors 342, 344, 346 in order to define the extent to which each processing level PL0, PL1, PL2 contribute to the output 250 (see FIGS. 2 and 3) of the method being implemented by the machine learning algorithm. As a result of the training procedure of this algorithm, the underlying model is able to dynamically determine which spatial-temporal data or features extracted on the respective processing level PL0, PL1, PL2 are best suited to meet a target objective functions provided e.g. by the ground truth for the training and based on the characteristics obtained via the perception system 110 of the vehicle 100. Hence, the method is able to be flexibly adapted to varying environmental conditions which can be acquired by the characteristics detected in the environment of the host vehicle 100.

The value vectors 342, 344, 346 are obtained in a similar manner as the key vectors 332, 334, 336 from the feature maps $H_{t,i}$ provided from the respective ConvGRU 332, 334, 336. In detail, the respective value vectors are defined as follows:

$$V_i = f_{\theta_V}^{V}(H_{t,i}) \quad \forall\, i \in [1, \ldots, N_p] \tag{7}$$

wherein $f^V$ defines a dense layer with trainable parameters $\theta_V$ which is followed by an elu activation function. The value vectors include feature encodings per cell of the associated grid map on each processing level PL0, PL1, PL2. The value vectors 342, 344, 346 which are combined with the weights $W^{Att}$ on each processing level PL0, PL1, PL2 at 430 are then summed or aggregated at 440 in order to provide the result 250 of the method according to the disclosure. The value vectors are defined regarding their dimension by $$V_i \in \mathbb{R}^{d_V \times L_i \times T_i} \quad \forall\, i \in [1, \ldots, N_p] \tag{8}$$

wherein the $d_V$ denotes the length of the value vectors which may vary from the dimension $d_K$ of the key vectors described above.

Figure 5:
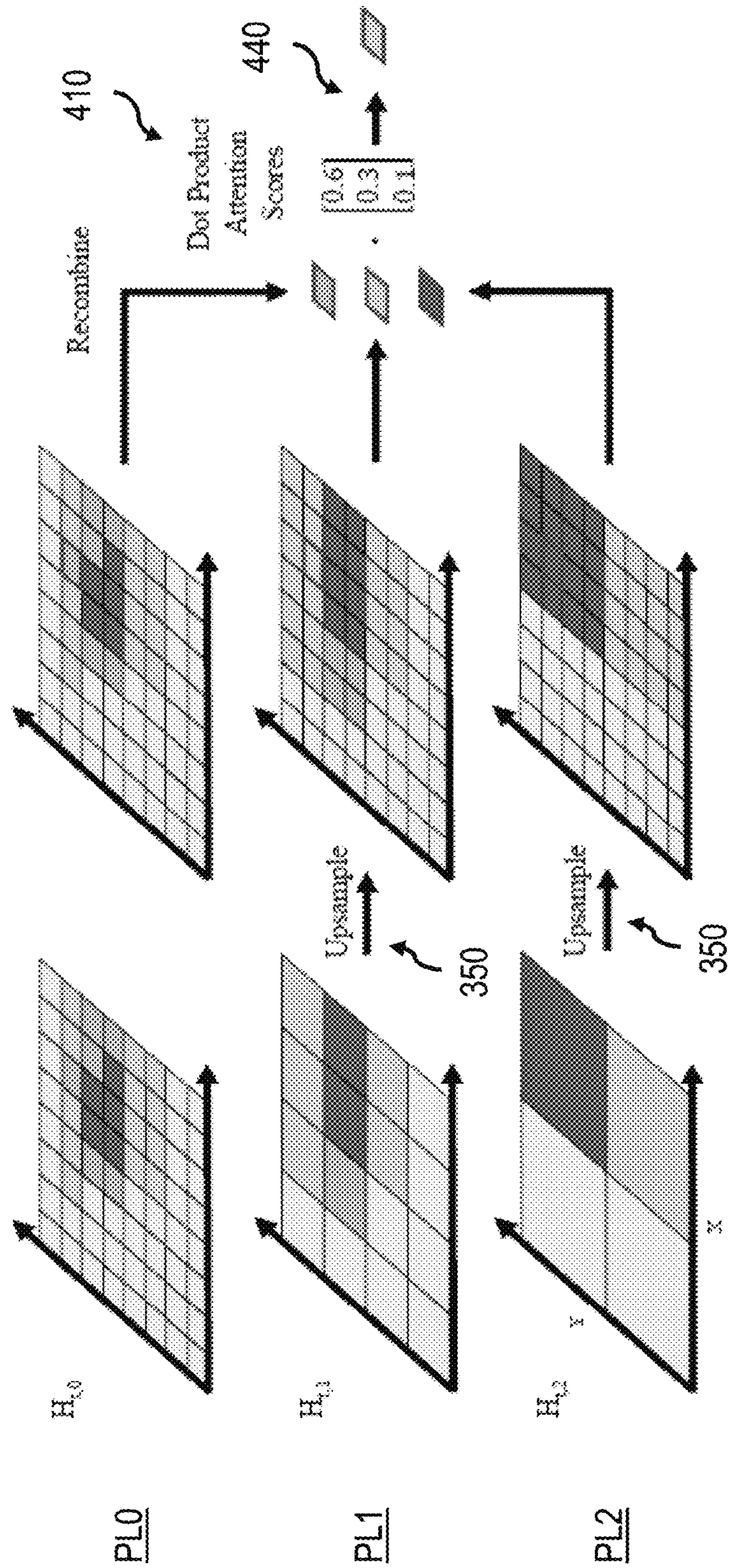
FIG. 5 is an illustration of an up-sampling procedure for data associated with different scales on different processing levels.

FIG. 5 depicts details for the up-sampling 350 (see FIG. 3) which is required for the second and third processing levels PL1, PL2 before performing the aggregation of the processing levels PL0, PL1, PL2. As can be seen on the left side of FIG. 5, the respective grids associated with the memory data 222, 224, 226 and therefore with the output features of the respective Conv Gro 332, 334, 336 have different special resolutions for each processing level PL0, PL1, PL2. In order to be compatible with the dimensions of the query vector or matrix 310, a nearest neighbor interpolation or a bilinear interpolation is applied to the data associated with the respective grid map on the second and third processing level PL1, PL2 in order to provide a respective grid map having the same resolution as the grid map associated with the data on the first processing level PL0. This is shown by the grid maps in the middle of FIG. 5. After the up-sampling 350, the steps as described before in context of FIG. 4 are applied to each grid cell, particularly the application of the dot product attention 410 and the aggregation 440 in order to provide a grid cell for the output 250 of the method.

Figure 6:
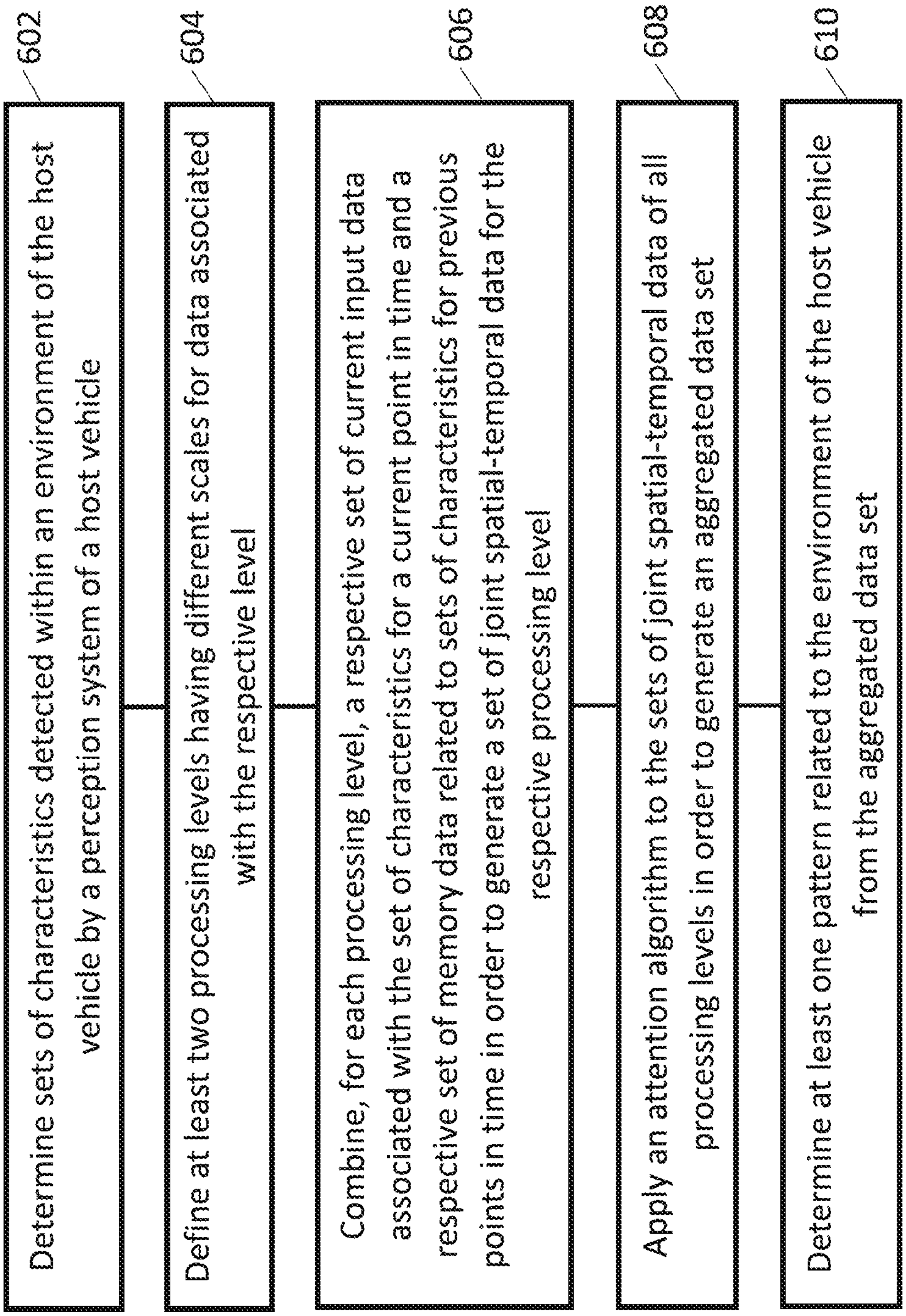
FIG. 6 is an illustration of a flow diagram illustrating a method for determining patterns related to an environment of a host vehicle from sequentially recorded data according to various embodiments.

FIG. 6 shows a flow diagram 600 illustrating a method for determining patterns related to an environment of a host vehicle from sequentially recorded data.

At 602, sets of characteristics may be determined within the environment of a host vehicle, wherein the characteristics may be detected by a perception system of the host vehicle. At 604, at least two processing levels having different scales may be defined for data associated with the respective level via a processing unit of the host vehicle. At 606, for each processing level a respective set of current input data associated with the set of characteristics for a current point in time may be combined with a respective set of memory data related to sets of characteristics for previous points in time in order to generate a set of joint spatial-temporal data for the respective processing level. At 608, an attention algorithm may be applied to the sets of joint spatial-temporal data of all processing levels in order to generate an aggregated data set. At 610, at least one pattern related to the environment of the host vehicle may be determined from the aggregated data set.

According to various embodiments, the respective set of current input data and the respective sets of memory data may be associated with respective grid maps having different respective spatial resolutions on each processing level.

According to various embodiments, a first processing level may be provided with a highest grid resolution, and subsequent processing levels may be provided with a grid resolution being lower than the highest grid resolution.

According to various embodiments, the attention algorithm may include a query vector being independent from the processing levels.

According to various embodiments, the attention algorithm may include respective key and value vectors defined on each respective processing level after combining the respective set of current input data with the respective set of memory data.

According to various embodiments, the key vectors of each processing level may be combined with the query vector in order to provide weights for elements of the value vector.

According to various embodiments, the respective key vector and the respective value vector defined on the respective processing level may be up-sampled to a resolution of the query vector if the resolution of the respective processing level is lower than the resolution of the query vector.

According to various embodiments, the up-sampling of the key vector may be performed by applying an interpolation to elements of the key vector.

According to various embodiments, the combination of the respective set of current input data and the respective set of memory data may be provided by applying a recurrent algorithm on each processing level.

According to various embodiments, the at least one pattern related to the environment of the host vehicle may be associated with at least one object being detected in the environment of the host vehicle.

According to various embodiments, the at least one pattern associated with the at least one object may be employed for tracking the object.

Each of the steps 602, 604, 606, 608, 610, 612 and the further steps described above may be performed by computer hardware components.

Figure 7:
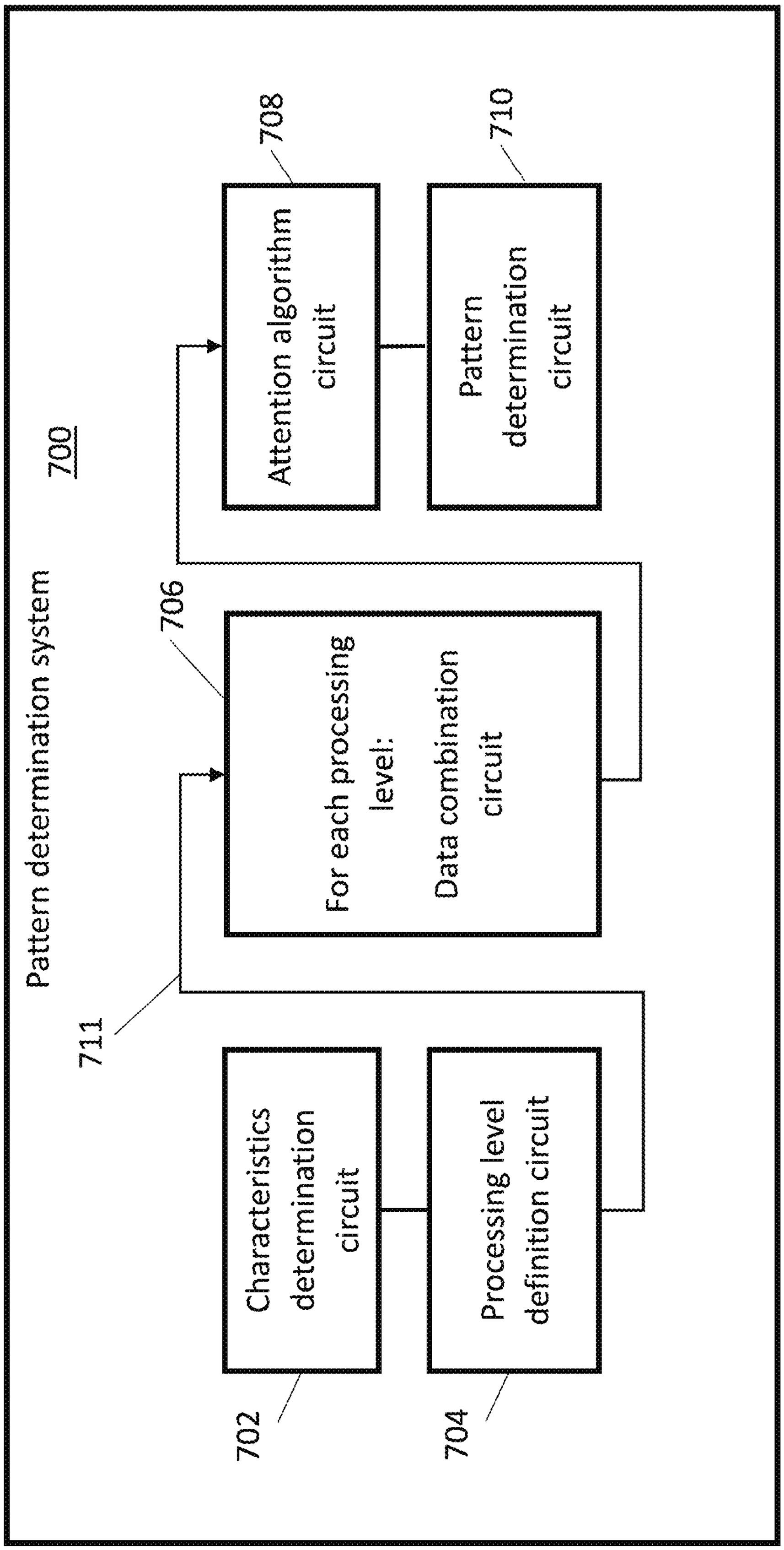
FIG. 7 is an illustration of a system according to various embodiments.

FIG. 7 shows a pattern determination system 700 according to various embodiments. The pattern determination system 700 may include a characteristics determination circuit 702, a processing level definition circuit 704, a data combination circuit 706, an attention algorithm circuit 708 and a pattern determination circuit 710. The pattern determination system 700 may include a respective data combination circuit 706 for each processing level defined by the processing level definition circuit 704.

The characteristics determination circuit 702 may be configured to determine sets of characteristics detected within an environment of the host vehicle by a perception system of a host vehicle.

The processing level definition circuit 704 may be configured to define at least two processing levels having different scales for data associated with the respective level.

The data combination circuit 706 may be configured to combine, for each processing level, a respective set of current input data associated with the set of characteristics for a current point in time and a respective set of memory data related to sets of characteristics for previous points in time in order to generate a set of joint spatial-temporal data for the respective processing level.

The attention algorithm circuit 708 may be configured to apply an attention algorithm to the sets of joint spatial-temporal data of all processing levels in order to generate an aggregated data set.

The pattern determination circuit 710 may be configured to determine at least one pattern related to the environment of the host vehicle from the aggregated data set.

The characteristics determination circuit 702, processing level definition circuit 704, the data combination circuit 706, the attention algorithm circuit 708 and pattern determination circuit 710 may be coupled to each other, e.g. via an electrical connection 711, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 8:
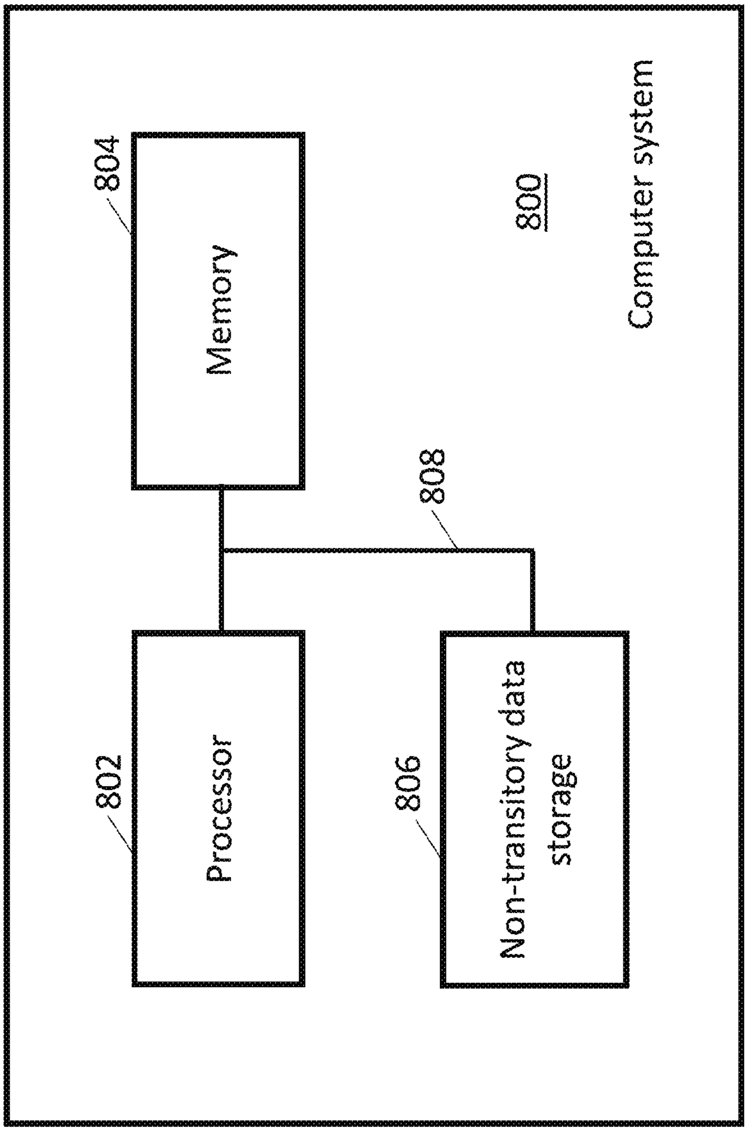
FIG. 8 is an illustration of a computer system with a plurality of computer hardware components configured to carry out steps of a computer implemented method as described herein.

FIG. 8 shows a computer system 800 with a plurality of computer hardware components configured to carry out steps of a computer implemented method for predicting respective trajectories of a plurality of road users according to various embodiments. The computer system 800 may include a processor 802, a memory 804, and a non-transitory data storage 806.

The processor 802 may carry out instructions provided in the memory 804. The non-transitory data storage 806 may store a computer program, including the instructions that may be transferred to the memory 804 and then executed by the processor 802.

The processor 802, the memory 804, and the non-transitory data storage 806 may be coupled with each other, e.g. via an electrical connection 808, such as e.g. a cable or a computer bus or via any other suitable electrical connection to exchange electrical signals.

As such, the processor 802, the memory 804 and the non-transitory data storage 806 may represent the characteristics determination circuit 702, the processing level definition circuit 704, the data combination circuit 706, the attention algorithm circuit 708 and the pattern determination circuit 710, as described above.

The terms “coupling” or “connection” are intended to include a direct “coupling” (for example via a physical link) or direct “connection” as well as an indirect “coupling” or indirect “connection” (for example via a logical link), respectively.

It will be understood that what has been described for one of the methods above may analogously hold true for the pattern determination system 700 and/or for the computer system 800.

REFERENCE NUMERAL LIST

100 vehicle
110 perception system
115 field of view
120 computer system
121 processing unit
122 memory, database
124 control system
125 dynamic context
130 object
140 vehicle
150 pedestrian
160 static context
170 traffic sign
180 lane markings
210 original set of current input data
212, 214, 216 input data on the first, second and third processing levels
222, 224, 226 memory data on the first, second and third processing levels
232, 234, 236 recurrent unit on the first, second and third processing levels
240 attention algorithm
250 output
260 task module
310 query vector or matrix
312 layer norm
320 maxpool layers
332, 334, 336 key vectors on the first, second and third processing levels
342, 344, 346 value vectors on the first, second and third processing levels
350 up-sampling
360 aggregation module
410 application of dot product
412 scaling
420 softmax function
430 weighting of value vectors
440 aggregation of the processing levels
600 flow diagram illustrating a method for determining patterns related to an environment of a host vehicle from sequentially recorded data
602 step of determining sets of characteristics detected within the environment of the host vehicle by a perception system of the host vehicle
604 step of defining, via a processing unit of the host vehicle, at least two processing levels having different scales for data associated with the respective level
606 step of combining, for each processing level, a respective set of current input data associated with the set of characteristics for a current point in time and a respective set of memory data related to sets of characteristics for previous points in time in order to generate a set of joint spatial-temporal data for the respective processing level
608 step of applying an attention algorithm to the sets of joint spatial-temporal data of all processing levels in order to generate an aggregated data set
610 step of determining at least one pattern related to the environment of the host vehicle from the aggregated data set
700 pattern determination system
702 characteristics determination circuit
704 processing level definition circuit
706 data combination circuit
708 attention algorithm circuit
710 pattern determination circuit
711 connection
800 computer system according to various embodiments
802 processor
804 memory
806 non-transitory data storage
808 connection
K0, K1, K2 key vectors
L number of pixels or cells in longitudinal direction
Q query vector
PL0, Pl1, Pl2 processing levels
T number of pixels or cells in transversal direction
V0, V1, V2 value vectors
W weight

What is claimed is:

1. A computer implemented method for determining patterns related to an environment of a host vehicle from sequentially recorded data, the method comprising:
determining sets of characteristics detected within the environment of the host vehicle by a perception system of the host vehicle, and
via a processing unit of the host vehicle:
defining at least two processing levels having different scales for data associated with the respective level,
for each processing level, combining a respective set of current input data associated with the set of characteristics for a current point in time and a respective set of memory data related to sets of characteristics for previous points in time in order to generate a set of joint spatial-temporal data for the respective processing level,
applying an attention algorithm to the sets of joint spatial-temporal data of all processing levels in order to generate an aggregated data set, and
determining at least one pattern related to the environment of the host vehicle from the aggregated data set,
wherein the attention algorithm includes a query vector that is independent from the processing levels, and includes respective key vectors and value vectors defined on each respective processing level after combining the respective set of current input data with the respective set of memory data.

2. The computer implemented method according to claim 1, wherein:
the respective set of current input data and the respective set of memory data are associated with respective grid maps having different respective spatial resolutions on each processing level.

3. The computer implemented method according to claim 2, wherein:

a first processing level is provided with a highest grid resolution, and subsequent processing levels are provided with a grid resolution being lower than the highest grid resolution.

4. The computer implemented method according to claim 1, wherein:

the key vectors of each processing level are combined with the query vector in order to provide weights for elements of the value vectors.

5. The computer implemented method according to claim 4, wherein:

the respective key vector and the respective value vector defined on the respective processing level are up-sampled to a resolution of the query vector if the resolution of the respective processing level is lower than the resolution of the query vector.

6. The computer implemented method according to claim 5, wherein:

the up-sampling of the key vector is performed by applying an interpolation to elements of the key vector.

7. The computer implemented method according to claim 1, wherein:

the combination of the respective set of current input data and the respective set of memory data is provided by applying a recurrent algorithm on each processing level.

8. The computer implemented method according to claim 1, wherein:

the at least one pattern related to the environment of the host vehicle is associated with at least one object being detected in the environment of the host vehicle.

9. The computer implemented method according to claim 8, wherein:

the at least one pattern associated with the at least one object is employed for tracking the object.

10. A computer system configured to:

receive respective sets of characteristics within the environment of a host vehicle, the characteristics being detected by a perception system of the host vehicle for a current point in time and for a predefined number of points in time before the current point in time, and carry out the computer implemented method of claim 1.

11. A vehicle including the perception system and the computer system of claim 10.

12. The vehicle according to claim 11, further including a control system configured to receive information derived from the at least one pattern provided by the computer system and to apply the information for controlling the vehicle.

13. A non-transitory computer readable medium comprising instructions for carrying out the computer implemented method of claim 1.

* * * * *